Nov. 27, 1934.  F. S. STICKNEY  1,982,328
LIQUID TESTING DEVICE
Filed Nov. 17, 1930   2 Sheets-Sheet 1
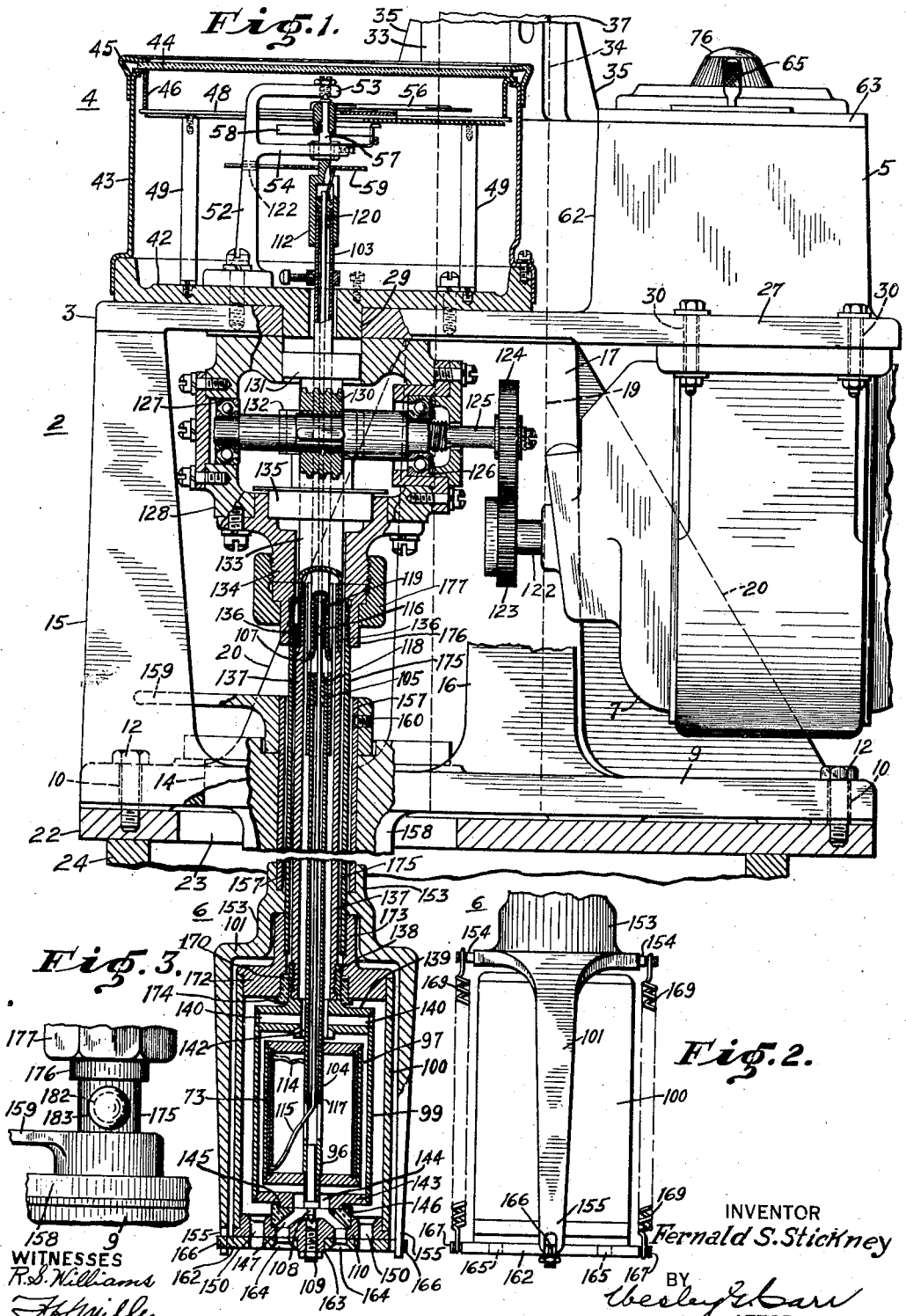
INVENTOR
Fernald S. Stickney Nov. 27, 1934.  F. S. STICKNEY  1,982,328
LIQUID TESTING DEVICE
Filed Nov. 17, 1930  2 Sheets-Sheet 2
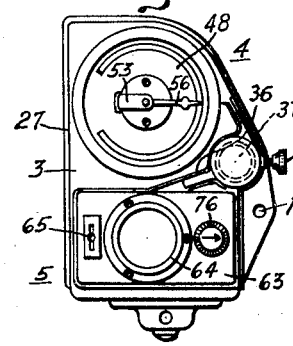
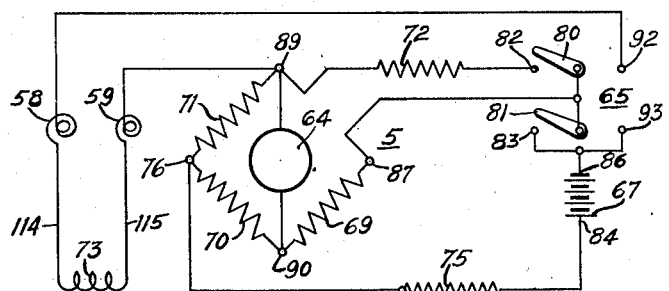
INVENTOR
Fernald S. Stickney
BY
ATTORNEY Patented Nov. 27, 1934

1,982,328

UNITED STATES PATENT OFFICE 1,982,328

LIQUID TESTING DEVICE

Fernald S. Stickney, West Orange, N. J., assignor to Westinghouse Electric & Manufacturing Company, a corporation of Pennsylvania Application November 17, 1930, Serial No. 496,222

7 Claims. (Cl. 265—11)

My invention relates to liquid-testing devices and particularly to means for measuring the viscosity and the temperature of paints and varnishes.

One object of my invention is to simultaneously measure, in a new and novel manner, the temperature and viscosity of a liquid during the course of its manufacture, whereby the production of the liquid in its most effective state is expedited to a high degree.

Another object of my invention is to provide a viscosimeter that shall have improved cooperation between a torque-effecting element and a torque-responsive element thereof, whereby the measuring of the viscosity of a liquid is rendered more effective.

Another object of my invention is to avoid the difficulties sometimes arising in connection with liquid-testing devices by reason of adherence of the test liquid to, and the hardening thereof on, the test-instrument parts.

A further object of my invention is to provide a liquid-testing unit that shall be simple and durable in construction, economical to manufacture and effective in its operation.

In my copending application, Serial No. 114,-270, filed June 7, 1926, and issued December 15, 1931 as Patent No. 1,836,995, is set forth a viscosimeter, or liquid-testing device, similar to my present invention, and of which the present invention is an improvement.

In the manufacture of certain liquids of the syrup type, such as paints, lacquers and varnishes, it is important that certain qualities, such as the viscosity and temperature, be known precisely, both as to degree and as to time.

Heretofore, in executing tests to determine the above mentioned qualities, it has been usual to remove test samples of the liquid from the tanks or vats in which they are being manufactured or undergoing a step in the process of manufacture. This procedure almost immediately renders the test sample different from the main body of the liquid remaining in the tank, so that, by the time the test is completed, it is not a true criterion of the qualities of the liquid in the tank or vat.

It has also been usual to test the viscosity and the temperature of a liquid by separate instruments, with the resulting loss of time, difficulty of manipulation of the instruments and other disadvantages.

Further, in working with liquids of the type under consideration, the implements employed become clogged with the hardened liquid, when exposed to air; and inconvenience, delay, expense and inaccuracy of subsequent tests ordinarily result.

It is my aim to overcome all of the disadvantages attending the testing of liquids of the above-indicated character and to provide a compact, effective unit that shall be free of clogging, that shall permit accurate, simultaneous and substantially instantaneous determination of both the viscosities and the temperature of the liquids during manufacture, without removing test samples from the production tanks, and that shall be an improvement, in general, over all prior instruments of which I am aware.

Figure 1 of the accompanying drawings is a side view, partially in elevation and partially in longitudinal section, of a liquid-testing device constructed in accordance with my invention, parts being broken away for clearness.

Fig. 2 is a view, in side elevation of, and at right angles to, a depending or bottom portion of the structure of Fig. 1, Fig. 3 is a detail side-elevational view of a portion of the structure shown in section in Fig. 1, Fig. 4 is a top plan view, to a reduced scale, of the device of Fig. 1, Fig. 5 is a view, similar to Fig. 1, of the structure thereof, but in elevation, at right angles thereto and to the scale of Fig. 4, Fig. 6 is a diagrammatic view of a temperature-measuring feature of my invention, parts of which are indicated in Figs. 1, 4 and 5, and the electrical circuits therefor, Fig. 7 is a view, partially in section and partially in broken lines, but, in general, similar to a portion of Fig. 5, showing a modified form of one detail feature of the invention.

Fig. 8 is a view, similar to Fig. 7, of a modification of another detail feature of the invention, and Fig. 9 is a top plan view of the structure shown in Fig. 8.

Referring to Figs. 1 to 6, inclusive, the device comprises, in general, a main support 2, an auxiliary or secondary support 3, a viscosity-indicating element 4, a temperature-measuring instrument 5, an element 6 for immersion in a liquid to be tested and for actuating the indicating element 4, and a motor 7 for operating the element 6.

The main support 2, preferably a metal casting, comprises a bed plate 9 having openings 10 for the reception of screws 12, a relatively larger opening 14 and upwardly-projecting arms 15, 16 and 17, the latter of which is provided with a longitudinal opening 19 and reinforcing webs 20. The screws 12 secure the support 2 to a plate 22 having an opening 23 therein and constituting the cover of a tank 24.

The secondary support 3, also preferably of metal, comprises a base plate 27 having openings 29 and 30 therethrough, and an upwardly-projecting portion 33 having an opening 34 therein, and reinforcing webs 35. A hollow standard or tube 37 is disposed in the openings 19 and 34 of the supports 2 and 3, respectively, being fixed to the main support 2, as by a set screw 38, shown in Fig. 5. The auxiliary support 3 is slidably mounted vertically on the standard 37 and is provided with a thumb-screw 40 in its portion 33 for securing it in position. The portion 33 is also provided with a web portion 36 having an opening 39 therein by which a rope or cable 41 may be attached and extend to a pulley and counterweight device (not shown) to assist in raising the support 3.

The indicating element 4 comprises a base plate 42, a side wall portion 43, a glass window 44, elements 45 and 46 for holding the window 44 in position, a scale plate 48, columns 49 for supporting the scale plate 48, a standard 52 having arms or portions 53 and 54 for supporting the moving parts of the meter, a pointer 56, a staff 57, control springs 58 and 59, and other elements interconnected with other parts of the device, as hereinafter set forth.

Referring to Figs. 1, 4, 5 and 6, the temperature-measuring instrument 5 comprises a casing portion 62, a cover 63, a milli-voltmeter 64, a control switch 65, a source of energy or battery 67, a Wheatstone bridge, including resistors 69, 70, 71, 72 and 73, and an adjustable rheostat 75, including an operating handle 76. The resistor 72 constitutes a test-spool which is adjusted to be of equal resistance value with the resistor 73 at the balance temperature; the rheostat 75 is for making minor adjustments of the circuit caused by variations in the battery voltage. The resistor or coil 73 is disposed in the element 6, as shown also in Fig. 1, and preferably has a high temperature coefficient of resistance.

Referring to Fig. 6, in adjusting the instrument 5 to balance the milli-voltmeter 64 before testing the liquid in the tank 24, the switch 65 is operated to engage its movable contact members 80 and 81 with stationary contact members 82 and 83, respectively. This operation completes a circuit from the positive terminal 84 of the battery 67, through the rheostat 75, to a point 76 between the resistors 70 and 71. The battery 67 is connected from its negative terminal 86, through the arm 81 of the switch 65, to a point 87 in the Wheatstone-bridge circuit. The resistors 69, 70 and 71 are of equal value, so that, with the arms 80 and 81 in contact with the members 82 and 83 and the milli-voltmeter 64 connected between points 89 and 90 of the bridge, the meter will be balanced or unbalanced in accordance with the values of the resistors 72 and 75. By adjusting the rheostat 75, the bridge may be compensated for voltage variations as the battery ages.

When the contact arms 80 and 81 are moved into engagement with the stationary contacts 92 and 93, the search coil 73 is substituted for the resistor 72, whereby the meter 64 is unbalanced in accordance with the resistance, and, hence, the temperature of the coil 73.

The element 6 comprises, in general, an inner hollow shaft or tube 96 for actuating the staff 57, a liquid-drag or viscosity-sensitive torque drum 97 secured to the shaft 96, a torque or drag-producing drum 99 for rotation about the drum 97 by the motor 7, a stationary enclosing drum or casing 100 and a yoke 101.

The tube 96 comprises upper and lower longitudinal sections 103 and 104, respectively, of the same diameter that are joined by a tubular coupling member 105 in telescopic relation. The tube 105 is fixed to the lower section 104 and is provided with longitudinal side-wall slots for cooperation with outwardly-bent portions 107 at the lower end of the upper section 103, so that, when the latter is thrust into the coupling 105, the portions 107 prevent relative rotation therewith. The lower end of the lower section 104 is provided with a bearing 108 for cooperation with a stationary bearing screw 109 in a member 110 to be hereinafter described. The upper end of the upper section 103 telescopically fits a recessed lower end portion 112 of the staff 57.

The search coil 73, in the drum 97, is provided with a ground-terminal conductor 114 that is connected by means of the parts 104, 105 and 103 of the shaft 96 and through the spring 58, to the standard 52. The coil 73 has a lead-in conductor 115 that extends through the separable sections 103 and 104 of the shaft 96, in spaced insulated relation thereto, by means of bushings or spacers 117, 118, 119 and 120, and, through the spring 59 and an insulating bushing 122, in the standard 52 to the temperature-measuring instrument 5. The conductor 115 is provided with a separable connector 116 of the plug-and-socket type between the insulating bushings 118 and 119.

The shaft 122 of the motor 7 carries a pinion 123 which engages a gear-wheel 124 on a shaft 125 that is carried in bearings 126 and 127 in a gear housing 128. The shaft 125 carries a worm-screw 130 that engages a worm-gear-wheel 132 on a hollow shaft or spindle 133 through which the shaft 96 extends. The shaft 133, journaled in bearings 131 and 135, projects downwardly through a bottom portion 134 of the gear housing 128 and has lower-end fingers 136 which fit corresponding side slots in a tube 137, constituting an extension of the shaft 133, to rotate therewith and to be withdrawable longitudinally therefrom.

The lower end of the shaft or tube 137 is secured to a screw-threaded sleeve 138 on the upper end member 139 of the drum 99. The end member 139 has radial upper-end openings 140 which provide communication, through an opening 142 adjacent to the shaft 96, between the interior of the drum 99 and the exterior thereof, which is the interior of the drum 100.

The lower-end member 143 of the drum 99 has a central opening 144 in a portion 145, which surrounds the shaft 96 in spaced relation thereto, and bears against a thrust-bearing member 146 having openings 147 therein. The bearing member 146, in turn, rests on the member 110 constituting the lower end of the drum 100 and having openings 150 therein.

The yoke member 101 comprises a sleeve portion 153, oppositely-disposed upper radial projections 154, and bifurcated lower-end arm portions 155. The sleeve portion 153 is fitted to a tube 157 which projects upwardly therefrom and, through a bearing member 158 in the opening 14 in the bed plate 9, to a position above the latter, where a handle 159 is secured thereto, as by a set screw 160.

A plate 162, below the member 110, pivotally fits a bearing portion 163 thereof and is provided with openings 164 and 165 and radial projections 166 and 167. The openings 164 are adapted, in one position of the plate 162, to register with the openings 147 in the bearing member 146 and, in another position, to close said openings. Similarly, the openings 165 are adapted, in the first of said positions of the plate 162, to register with the openings 150 in the member 110 and, in the other position, to close said openings. The radial projections 166 are embraced laterally by the bifurcated portions 155 of the yoke arms 101, and the projections 167 are connected to the projections 154 by springs 169.

The enclosure drum 100 is provided with an upper-end closure member 172 having a sleeve 173 and an inner portion 170 for the reception of a bearing member 174 in which the sleeve 138 rotates. A tube 175 is secured in position in the sleeve 173 and extends upwardly to a position adjacent to the bottom portion 134 of the gear-housing 128 to which it is secured by separable coupling members 176 and 177.

A side-tap nipple 182 in the tube 175 having a closure cap 183 (see Figs. 3 and 5) provides for the admission of a solvent liquid to the element 6 when the device is not in use.

With the parts assembled and positioned as shown, the device is inoperative, since the switch 65 of Fig. 6 is open and the lower end of the element 6 is closed to the admission of the liquid to be tested. However, so far as the positions of the major elements 2, 3 and 6 are concerned, the latter is in its lowermost position which it occupies when in the liquid.

Thus, to operate the device, the switch 65 is moved to place the arms 80 and 81 in contact with the stationary contact members 92 and 93, respectively. This operation places the temperature-measuring feature of the device in condition to give an indication of the temperature of the liquid, as above set forth.

The handle 159 is turned about the longitudinal axis of the element 6, which movement causes the openings 164 and 165 to move into registration with the openings 147 and 150, respectively. This operation places the element 6 in condition to receive the liquid to be tested.

When the motor 7 is energized, motion is transmitted thereby, through the shaft 122, the pinion 123, the gear-wheel 124, the shaft 125, the worm screw 130, the worm wheel 132, the hollow shaft 133 and the tube 137, to the torque-producing drum 99.

The liquid passes through the openings 164 and 147 in the drum 99 to fill the space about the drum 97 and to pass through the openings 142 and 140 to the space in the drum 100 about the drum 99 and out through the openings 150 and 165. While thus passing through the drum 99, the temperature of the liquid affects the search coil 73, and the drum 97 is dragged about its axis, against the action of the springs 58 and 59, in accordance with the viscosity of the liquid. Thus, simultaneous indications of viscosity and temperature are given.

If the drum 99 were merely open at the top adjacent to its perimeter, rotation thereof would cause the liquid therein to be depressed at its center and elevated at the inner side walls, so that portions of the drum 97, near the top thereof, would not be in engagement therewith. This effect would cause inaccuracy in the viscosity indication, since the drag area of the drum 97 is a function of the indication.

However, by compelling the liquid to leave the drum 99 through the small opening 142, the above-mentioned effect is eliminated, and the drum 97 is completely submerged at all times.

When the liquid has reached its desired state of manufacture, as indicated by the instruments 4 and 5, the heating or other treatment thereof is stopped, and the auxiliary support 3 is raised, so that the element 6 is withdrawn from the liquid. This withdrawal is effected by releasing the screw 40, raising the support 3 on the standard 37 and again setting the screw 40 to hold the support in its upper position.

After as much of the liquid drains from the element 6, as may quickly and conveniently do so, the handle 159 is turned in reverse direction to close the openings 150 and 164 and, therefore, the drum 100.

If the liquid is of a hardening character, and it is not intended to again operate the device before such hardening has reached a certain state, the cap 183, on the nipple 182, may be removed, and a quantity of solvent liquid placed in the element 6. This operation prevents clogging of the inner working parts.

Referring to the modification of my invention shown in Fig. 7, in which corresponding parts are designated by corresponding reference characters, a conducting lead 186 for the motor 7 is introduced through a stationary insulating bushing 187 near the upper end of the standard 37, to the interior of the latter, and, through a helically-coiled portion 188 of the lead 186 therein, to an insulating bushing 189 which acts as a guide in a vertical slot 190 in the standard. A portion 192 of the lead 186 and the coil 188 extends, through the bushing 189, to the motor 7.

When the support is raised from the position shown in Fig. 7, since the motor 7 is secured thereto, the coil 188 will be compressed like a helical spring and be again extended when the support is lowered. This feature provides protecting armor for the lead 186 and compensates for the movement of the support 3, so that there will be no appreciable length of loose conductor to become entangled about the device.

In Figs. 8 and 9, the cable 41 is connected to, and wound about, a pulley 192 that is mounted on a shaft 193. The latter is mounted in a support 194 on the standard 37 and carries a pinion 195 that engages a gear-wheel 196 on a shaft 197. The latter carries a pinion 198 that engages a gear wheel 199 on a shaft 200 which also carries a pulley 202. A cable 203, secured to the pulley 202, carries a weight 204. In this structure, the arrangement of parts and gear ratio are such that small vertical movements of the weight 204 cause a sufficient movement of the support 3 to carry it between its extreme upper and lower positions.

While the structures of Figs. 7 and 8 have been illustrated separately for clearness, they may be combined with each other and with the structure of the other figures in one composite unit.

Various other changes may be effected in the structure within the spirit and scope of the invention, as set forth in the appended claims.

I claim as my invention:

1. A liquid-testing device comprising a torque-responsive element, a torque-producing element, means for selectively enclosing said elements hermetically against, and exposing the same to, the liquid to be tested, including a casing having a plurality of ports and means for controlling the opening and closing of said ports, and means for admitting a liquid to said casing when said ports are closed.

2. A liquid-testing device comprising a structure including viscosity-responsive and temperature-responsive elements, means for movably supporting said structure for movement into or out of said liquid, a spring for controlling movement of the viscosity-responsive element, said spring being for position exterior to the liquid and means, including said spring, for electrically connecting said temperature-responsive element to an element exterior to the liquid.

3. A liquid-testing device comprising a structure including a viscosity-measuring device and a temperature-measuring device, said structure being for position exterior to the liquid, a second structure including means for actuating said viscosity-measuring device and means for actuating said temperature-measuring device, said second structure being for position in the liquid, and separable coupling means between said measuring devices and actuating means for simultaneously connecting and disconnecting the same.

4. A liquid-testing device comprising a structure including a mechanically-operated viscosity-measuring device and an electro-responsive temperature-measuring device, said structure being for position above the liquid, a unitary structure including means for actuating said viscosity-measuring device and means for actuating said temperature-measuring device, said unitary structure being for position in the liquid and means extending between said structures including a hollow column, substantially plug-and-socket connecting means in the column for said measuring devices, and actuating means whereby said structures may be placed together and separated by simple thrust movements, and means for holding said connecting means against separation.

5. In combination, a main stationary support including a vertical hollow standard, a secondary support for vertical movement relative thereto, means on said secondary support for measuring the viscosity of a liquid, including an electrical element, and relatively rotatable elements responsive to said vertical movement for immersion in, and withdrawal from, a liquid, and a flexible conducting lead for said electrical element and disposed in said standard.

6. In combination, a main stationary support including a vertical standard, a secondary support for vertical movement relative thereto, means on said secondary support for measuring the viscosity of a liquid, including relatively rotatable elements responsive to said vertical movement for immersion in, and withdrawal from, a liquid, and means mounted on said standard for counterbalancing the weight said secondary support and its associated elements.

7. A liquid-testing device comprising a main stationary support for mounting or a receptacle for a liquid to be tested, a secondary support movably mounted on said stationary support, one of said supports including an elongated upright bearing element telescopically fitting a cooperating bearing element on the other, and liquid-testing means mounted on said secondary support and movable therewith to immerse a portion of said testing means in, and withdraw the same from, the liquid.

FERNALD S. STICKNEY.